United States Patent Office 3,703,587
Patented Nov. 21, 1972

3,703,587
USE OF POLY-E STER-AMIDE-ACIDS AS RUST OR CORROSION INHIBITORS
Theodore Spanos III, Immokalee, Fla., and Richard L. Godar, St. Louis, Mo., assignors to Petrolite Corporation, Wilmington, Del.
No Drawing. Original application June 3, 1968, Ser. No. 733,788. Divided and this application June 7, 1971, Ser. No. 150,833
Int. Cl. C23f 11/14
U.S. Cl. 21—2.5
8 Claims

ABSTRACT OF THE DISCLOSURE

Process of inhibiting corrosion of metals and alloys in contact with corrosive media comprising contacting said metals and alloys with poly-ester-amide-acids formed by reacting (1) an alkyl or an alkenyl succinic acid or the anhydride thereof with (2) a polyol, the product of which is reacted with an alkanol amine to form an ester-amide and then reacting so-formed ester-amide with an alkyl or an alkenyl succinic acid or the anhydride thereof.

This application is a divisional application of our Application Serial No. 733,788, entitled Poly-Ester-Amide-Acids, filed on June 3, 1968, now U.S. Pat. No. 3,654,346 granted on Apr. 4, 1972.

This invention relates to the reaction products of (1) an alkyl or alkenyl succinic acid or an anydride thereof (also referred to as ASAA) with (2) a polyol, preferably a diol and (3) an alkanolamine (the reaction products referred to as "Poly-Ester-Amide Acids"). In the preferred embodiment (1) ASAA is reacted first with (2) a diol which is then reacted with (3) an alkanol amine which is then reacted with (4) ASAA; and to the uses for these products, particularly as rust and corrosion inhibitors.

These Poly-Esters-Amide Acids are preferably prepared by a step-wise reaction but may also be prepared by reacting all components at once.

STEP 1

When the step-wise procedure is employed, partial esters of an alkyl or alkenylsuccinic anhydride i.e. ASAA are first prepared by the reaction of one molar equivalent of a polyhydric alcohol with two molar equivalents of ASAA. Structurally they are most conveniently represented by the formula:

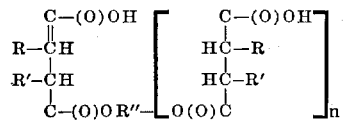

wherein of the radicals R and R', one is hydrogen and the other is selected from a group comprising alkyl and alkenyl radicals, preferably containing from 8 to 18 carbon atoms, and R" is the residue of the polyhydric alcohol which generically may contain oxygen, sulfur or nitrogen in the chain as well as ester substituents, and preferably contains from 2 to 6 carbon atoms. The integer $n$ represents a number from 1 to 4 to indicate that within the purview of the invention are included the derivatives of diols, triols and other polyhdroxycompounds.

A typical procedure for the preparation of the partial ester is the following which is illustrative only as a non-limiting procedure. The desired substituted succinic anhydride and alcohol charges are weighed into a suitable jacketed acid-resisting vessel equipped with agitation temperature recording means and a reflux condenser. The charge is heated to about 95–100° C. while agitating and held thereat and the progress of the reaction observed from time to time by withdrawing a sample and determining the neutralization number thereof. Heating is continued until the desired neutralization number is obtained or until it remains substantially constant. The reaction occurring is represented as follows:

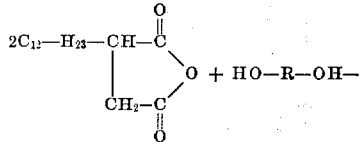

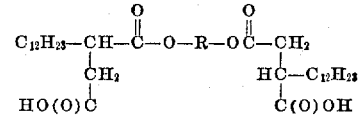

The following are illustrative products obtained by heating one molecular proportion of a dihydric alcohol with two molecular proportions of an alkenylsuccinic anhydride. In each case the alkenylsuccinic anhydride used was dodecenylsuccinic anhydride prepared from propylene tetramer and maleic anhydride and the product was prepared from the intermediate by heating at about 95–100° C. for the indicated times, generally without a solvent or diluent although in a few cases the reaction was carried out by heating in kerosene.

| Ex. | Alcohol HO—R—OH | Time of heating, hours | Neutralization Number Found | Calculated |
|---|---|---|---|---|
| 1 | Ethylene glycol | 15.0 | 199 | 188.5 |
| 2 | Propylene glycol | 23.0 | 210 | 184 |
| 3 | 1,4-butane diol | 4.0 | 181 | 180 |
| 4 | 1,3-butane diol | 9.0 | 178 | 180 |
| 5 | 2,3-butane diol | 16.5 | 194 | 180 |
| 6 | 2-butene-1,4-diol | 14.0 | 190 | 181 |
| 7 | Diethylene glycol | 4.0 | 183.4 | 175 |
| 8 | 2,2'-thio diethanol | 11.0 | 187 | 171 |
| 9 | 1,5-pentane diol | 10.0 | 184 | 176 |
| 10 | 1,4-pentane diol | 8.0 | 189 | 176 |
| 11 | Neopentyl glycol | 15.0 | 185 | 176 |
| 12 | 1,6-hexane diol | 4.0 | 176 | 172 |
| 13 | 2-methyl-2,4-pentane diol | 18.0 | 250 | 172 |
| 14 | Methyl-1,3-pentane diol | 25.0 | 187 | 172 |
| 15 | Dipropylene glycol | 9.0 | 175 | 168 |
| 16 | Triethylene glycol | 4.5 | 183 | 163 |
| 17 | 2,2,4-trimethyl-1,3-pentane diol | 15.0 | 165 | 165 |
| 18 | 2-ethylhexane diol-1,3 | 13.0 | 181 | 165 |
| 19 | 2,2-diethylpropane diol-1,3 | 9.0 | 159 | 169 |
| 20 | 2,5-dimethylhexane-2,5-diol | 24.5 | 271 | 165 |
| 21 | Phenyl-1,2-ethane diol | 13.5 | 188 | 167 |
| 22 | 2-ethyl-2-butylpropane diol-1,3 | 10.0 | 161 | 162 |
| 23 | 3,6-dimethyloctane 3,6-diol | 18.5 | 263 | 158 |
| 24 | Polyetylene glycol 200 | 4.0 | | 153 |
| 25 | Polyethylene glycol 400 | 4.0 | 126 | 121 |
| 26 | Polypropylene glycol 150 | 19.0 | 179 | 164 |
| 27 | Polypropylene glycol 425 | 15.0 | 129 | 118 |
| 28 | 3-methyl-1,5-pentane diol | 10.0 | 174 | 174 |
| 29 | Trimethylene glycol | 11.0 | 210 | 184 |

All of the foregoing products were soluble in petroleum ether except the products from polyethylene glycol 200 and polyethylene glycol 400 which were partially soluble. The numbers following the glycol polymers indicate the molecular weight.

The polyols may also be derived from polyalkylene-ether glycols derived from alkylene oxides added as homo-polymers, heteric polymers, block polymers, etc.,

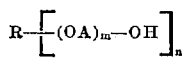

where OA is derived from an alkylene oxide, i.e. ethylene oxide, propylene oxide, butylene oxide, hexylene oxide, styrene oxide, etc. where $m$ represents the moles of alkylene oxide added and $n$ the number of oxyalkylated groups.

Using dodecenylsuccinic anhydride as employed in the above examples, further illustrative examples are set forth below in which the ratio of the reactants varied.

All these products were prepared by heating at approximately 95–105° C. for the times indicated. TPSA means tetrapropenyl (dodecenyl) succinic anhydride.

| Ex. | Hydroxy reactant R(OH)ₙ | Ratio of TPSA to hydroxy reactant | Time of heating, hours | Neutralization Number Found | Neutralization Number Calculated |
|---|---|---|---|---|---|
| 30 | 1,2,4-butane triol | 3/1 | 9.0 | 191 | 187 |
| 31 | Castor oil | 3/1 | 3.0 | 107 | 97 |
| 32 | Triethanolamine | 3/1 | 6.5 | 170 | 177 |
| 33 | Glycerol | 2/1 | 15.0 | 196 | 180 |
| 34 | Pentaerythritol | 2/1 | 23.0 | | 168 |
| 35 | do | 4/1 | 19.0 | | 187 |

The following are illustrative of products in which the alkenylsuccinic anhydride varied. These products were prepared by heating one molecular proportion of a dihydric alcohol with two molecular proportions of the alkenylsuccinic anhydride at 95–125° C.

| Ex. | Alcohol | Anhydride | Time of heating, hours | Neutralization Number Found | Neutralization Number Calculated |
|---|---|---|---|---|---|
| 36 | 2-methyl-2,4-pentane diol | NOSA | 28.0 | 267 | 208 |
| 37 | do | NDDSA | 28.0 | 224 | 173 |
| 38 | do | HDSA | 26.0 | 192 | 147 |
| 39 | do | ODSA | 26.0 | 170 | 137 |
| 40 | 1,4-butane diol | NOSA | 9.0 | 225 | 220 |
| 41 | do | NDDSA | 13.0 | 181 | 180 |
| 42 | do | HDSA | 13.0 | 144 | 153 |
| 43 | do | ODSA | 13.0 | 118 | 142 |

NOTE.—NOSA=n-Octenylsuccinic anhydride; NDDSA=n-Dodecenylsuccinic anhydride; HDSA=n-Hexadecenylsuccinic anhydride; ODSA=n-Octadecenylsuccinic anhydride.

Any alkenyl succinic acid anhydride or the corresponding acid is utilizable for the production of the reaction products of the present invention. The general structural formulae of these compounds are:

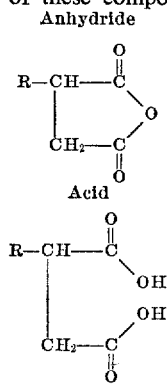

wherein R is an alkenyl radical. The alkenyl radical can be straight-chain or branched-chain; and it can be saturated at the point of unsaturation by the addition of a substance which adds to olefinic double bonds, such as hydrogen, sulfur, bromine, chlorine, or iodine. It is obvious, of course, that there must be at least two carbon atoms in the alkenyl radical, but there is no real upper limit to the number of carbon atoms therein. However, it is preferred to use an alkenyl succinic acid anhydride reactant having between about 8 and about 18 carbon atoms per alkenyl radical. In order to produce the reaction products of this invention, however, an alkenyl succinic acid anhydride or the corresponding acid must be used. Succinic acid anhydride and succinic acid are not utilizable herein. For example, the reaction product produced by reacting with succinic acid anhydride is unsatisfactory. Although their use is less desirable, the alkenyl succinic acids also react, in accordance with this invention, to produce satisfactory reaction products. It has been found, however, that their use necessitates the removal of water formed during the reaction and also often causes undesirable side reactions to occur to some extent. Nevertheless, the alkenyl succinic acid anhydrides and the alkenyl succinic acids are interchangeable for the purposes of the present invention. Accordingly, when the term "alkenyl succinic acid anhydride," is used herein, it must be clearly understood that it embraces the alkenyl succinic acids as well as their anhydrides, and the derivatives thereof in which the olefinic double bond has been saturated as set forth hereinbefore. Non-limiting examples of the alkenyl succinic acid anhydride reactant are ethenyl succinic acid anhydrides; ethenyl succinic acid; ethyl succinic acid anhydride; propenyl succinic acid anhydride; sulfurized propenyl succinic acid anhydride; butenyl succinic acid; 2-methyl-butenyl succinic acid anhydride; 1,2-dichloropentyl succinic acid anhydride; hexenyl succinic acid anhydride; hexyl succinic acid; sulfurized 3-methylpentenyl succinic acid anhydride; 2,3-dimethylbutenyl succinic acid anhydride; 3,3-dimethylbutenyl succinic acid; 1,2-dibromo-2-ethylbutyl succinic acid; heptenyl succinic acid anhydride; 1,2-diodooctyl succinic acid; octenyl succinic acid anhydride; 2-methylheptenyl succinic acid anhydride; 4-ethylhexenyl succinic acid; 2-isopropylpentyl succinic acid anhydride; nonenyl succinic acid anhydride; 2-propylhexenyl succinic acid anhydride; decenyl succinic acid; decenyl succinic acid anhydride; 5-methyl-2-isopropylhexenyl succinic acid anhydride; 1,2-dibromo-2-ethyloctenyl succinic acid anhydride; decyl succinic acid anhydride; undecenyl succinic acid anhydride; 1,2-dichloro-undecyl succinic acid; 3-ethyl-2-t-butylpentenyl succinic acid anhydride; dodecenyl succinic acid anhydride; dodecenyl succinic acid; 2-propylnonenyl succinic acid anhydride; 3-butyloctenyl succinic acid anhydride; tridecenyl succinic acid anhydride; tetradecenyl succinic acid anhydride; hexadecenyl succinic acid anhydride; sulfurized octadecenyl succinic acid; octadecyl succinic acid anhydride; 1,2-dibromo-2-methylpentadecenyl succinic acid anhydride; 8-propylpentadecyl succinic acid anhydride; eicosenyl succinic acid anhydride; 1,2-dichloro-2-methylnona decenyl succinic acid anhydride; 2-octyldodecenyl succinic acid; 1,2-diiodotetracosenyl succinic acid anhydride; hexacosenyl succinic acid, hexacosenyl succinic acid anhydride; and hentriacontenyl succinic acid anhydride.

The methods of preparing the alkenyl succinic acid anhydrides are well known to those familiar with the art. The most feasible method is by the reaction of an olefin with maleic acid anhydride. Since relatively pure olefins are difficult to obtain, and when thus obtainable, are often too expensive for commercial use, alkenyl succinic acid anhydrides are usually prepared as mixtures by reacting mixtures of olefins with maleic acid anhydride. Such mixtures, as well as relating pure anhydrides, are utilizable herein. Corresponding alkyl succinic anhydrides can also be employed, i.e. where the alkenyl group is saturated in any of the above instances, the preparation of alkyl succinic acids and anhydrides thereof is well known to the art.

STEP II

These partial-esters are then reacted with an alkanolamine to first form salts which are then acylated upon prolonged heating under dehydration conditions, preferably in the presence of an azeotroping agent such as benzene, xylene, etc.

The aminoalkanols employed in preparing the product of this invention contain alkylene or substituted alkylene radicals and both an amino and anhydroxyl radical. These can be expressed by the formula:

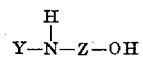

wherein Z is an alkylene or substituted alkylene radical preferably having at least three carbon atoms, for example 3 to 12 or more, but preferably 3 to 8 carbons; and Y is hydrogen or a hydrocarbon group, for example an aliphatic group, preferably lower alkyl.

Thus, Z is an alkylene radical which can be straight-chained or branched chain, for example propylene, butylene, pentylene, hexylene, heptylene, octylene, nonylene, decylene, etc., and isomers thereof, for example—isopropylene, isobutylene, isopentylene, isohexylene, isoheptylene, isooctylene, isononylene, isodecylene, etc. The alkylene radical can be straight chained singly branched, for example.

doubly branched,

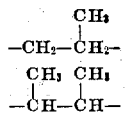

or multi-branched

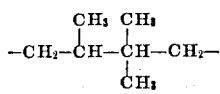

etc. In addition, the alkylene groups can be substituted with other groups, for example phenyl, tolyl, etc. In such instances the alkylene radical need not have three carbon atoms but may have only two, for example it may be ethylene wherein the ethylene radical also contains an aromatic group such as a phenyl group, etc. The amino or alcohol group can be attached to the carbon atoms of the alkylene radical which are primary, secondary, or tertiary carbons. The carbons to which these radicals are attached need not be of the same type. For example, in isopropanoline.

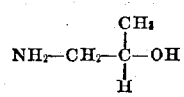

the preferred aminoalkanol, the alcohol radical is attached to a secondary carbon atom while the amino group is attached to a primary carbon atom. Examples illustrating various positions of attachment of the functional groups are:

5-amino-4-octanol,
1-amino-2-hexanol,
2-amino-3-hexanol,
2-amino-2-methyl-3-hexanol,
3-amino-4-hexanol,
2-amino-1-hexanol,
3-amino-2-hexanol,
1-amino-2-heptanol,
2-amino-3-heptanol,
3-amino-4-heptanol,
1-amino-2-octanol,
2-amino-3-octanol,
2-amino-2-methyl,
3-octanol,
3-amino-4-octanol,
2-amino-1-octanol,
3-amino-2-octanol, etc.

Although the above aminoalkanols are illustrated with aminoalkanol containing primary amino groups, it should be understood that corresponding compounds containing amidifiable secondary amino groups can also be employed.

Thus, aminoalkanols corresponding to those mentioned herein except that they contain N-aliphatic groups, such as N-alkyl groups, for example methyl, ethyl, propyl, butyl, pentyl, hexyl, octyl, octadecyl, cycloaliphatic, etc., isomeric alkyl groups, etc., can be employed in this invention. In addition, N-alkenyl or N-alkinyl groups can also be employed.

One convenient method of preparing these aminoalkanols is to react ammonia or a primary amine with an alkylene oxide on another hydrocarbon oxide having at least 3 carbon atoms, for example propylene oxide, butylene oxide, octylene oxide, styrene oxide, etc. Other methods of preparing these aminoalkanols are so well known to the art that it is unnecessary to repeat them here.

The partial ester is reacted under acylating conditions to yield a product which is primarily the amide for example of the formula

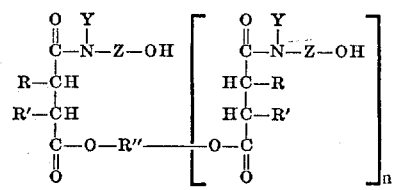

where the formula has the same meaning as stated above.

In the case of the diol partial ester, the product is

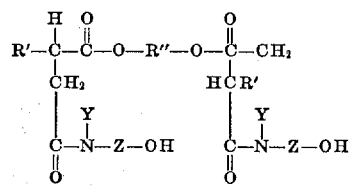

The R's in the above formula are arbitrarily assigned their positions but could also be on the other carbon of the ASAA.

The above are idealized formulae. In addition, some alkanol amine derived esters, alkanol amine derived salts, as well as alkanol amine derived amides including various combinations thereof could also be formed.

STEP III

In the final step, the ester-amide is then reacted again with ASAA or its equivalent to form an ester group and a terminal acid unit, for example according to the idealized formulae

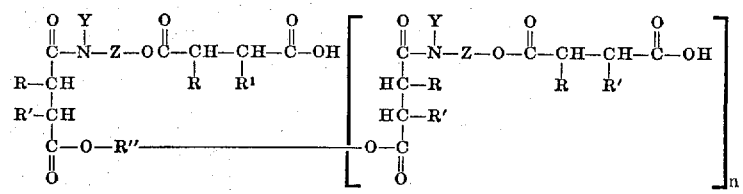

and in the case of the diol

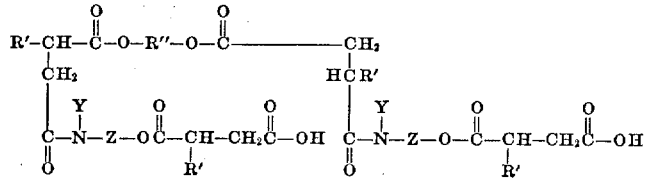

In summary, the products of the present invention are Poly-Ester-Amide-Acids which can be prepared in one step or step-wise. Preferably (1) the polyol is first reacted with sufficient ASAA for each ASAA to theoretically yield one ester group and one acid group, i.e. in the case of the diol (one mole of ASAA and one mole of diol). (2) This partial ester is then reacted with an alkanolamine so that only one acid group of (1) reacts with the alkanolamine leaving free OH groups and (3) the reaction product of (2) is then reacted with ASAA so that the ASAA reacts with each free hydroxy group so as to leave free acid groups.

It should be understood that these reacting ratios may be varied and that the formulae presented above are idealized and do not necessarily represent the exact structure in each case, but possible structures.

Although the sequential steps are presented to assist in controlling the types of reaction obtained, where appropriate, all reactants can be added simultaneously and then reacted.

The following example is presented for purposes of illustration and not of limitation.

EXAMPLE A

Step I—Two (2) moles of tetrapropenyl succinic anhydride (TPSA) are reacted with one (1) mole of ethylene glycol by heating to 200° C. and holding there for two hours.

Step II—One (1) mole of the product of Step I is reacted with one (1) mole monoisopropanolamine

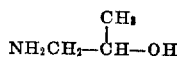

by heating in xylene to 140°–160° C. and distilling off one (1) mole of $H_2O$.

Step III—One (1) mole of the product in Step II is reacted with one (1) mole of TPSA by heating to 130° C. and holding at this temperature for three hours.

Employing the procedure of Example A, other ASAA's can be employed in place of TPSA and other polyols, glycols or diols can be employed in place of ethylene glycol, to form for example the partial ester disclosed herein. In addition, other alkanol amines can be employed in place of isopropanol amine in Step II such as disclosed herein. In Step III the ASAA employed may be the same or different from that disclosed in Step I.

By taking any reactants stated herein and reacting in the above manner, compositions of this invention suitable as rust inhibitors can be prepared.

Further examples: Any of the partial esters listed in the tables herein can be reacted with an alkanol amine such as isopropanolamine, which product can be further reacted with an ASAA in accord with the procedure of Example A to yield the products of this invention.

The compositions of this invention which are soluble or dispersible therein are particularly useful as rust or corrosion inhibitors such as in refined petroleum products such as in gasoline, aviation gasoline, jet fuels, turbine oils, fuel oils, etc.

They may be employed in any amount capable of inhibiting rust or corrosion, such as in minor amounts of at least 1 p.p.m., such as at least 5 p.p.m., for example 15 to 200 p.p.m., or more, but preferable 25–50 p.p.m. They are particularly effective in inhibition of rust and corrosion in refined petroleum products, such as petroleum distillates in contact with metals such as ferrous or other metal surfaces.

The following is a suitable test of evaluation for such compositions as rust inhibitors.

"SPINDLE" RUST TEST FOR PETROLEUM FUELS

This test method is a Tretolite Division, Petrolite Corporation modification of the "Standard method of test for rust-preventing characteristics of steam-turbine oil in the presence of water, ASTM designation: D665–60 procedure A for distilled water," an adaptation of the "Test for Presence and Evaluation of Product Soluble Rust Inhibitors" by P. L. Deverter, Inspection Laboratory, Humble Oil and Refining Co., published September 1953 in the Petroleum Engineer, observations of the steel test specimen surface preparation in a government laboratory, and over five years of successful correlation of this test procedure with actual pipe line corrosion experience. Included also is a legend for coupon rating used by some members of the National Association of Corrosion Engineers.

Scope

This method of test is intended to indicate the ability of petroleum fuels to aid in preventing the rusting of ferrous parts should water become mixed with the oil.

Nature of test

The method involves stirring a mixture of 300 ml. of the oil under test with 30 ml. of distilled water at a temperature of 72–75° F. with a cylindrical steel specimen completely immersed therein. It is customary to run the test for 1 hour, however, the test period may, at the discretion of the contracting parties, be for a longer period.

Apparatus

As specified in ASTM method D665–60 except for No. 100 Grade Aluminum Oxide Abrasive Cloth. No. 4/0 Flint Finishing Paper, and No. 0 Grade Emery polishing paper instead of No. 1 Emery cloth, No. 2/0–100 Waterproof Garnet Paper, Carborundum Brand.

Test specimen and its preparation

As specified in ASTM method D665–60, the test specimen shall be made of SAE 1020 steel. Only new test specimens or "like new" specimens that have been used previously in inhibited fuel and have not shown any rust shall be used in the test.

Polishing—Clean the new specimen with ASTM precipitation naphtha or isooctane just before the test is to be made, dry with a clean cloth and mount in the chuck of the polishing apparatus. Rotate the specimen at a speed of 1700 to 1800 r.p.m. while the polishing cloth and papers are being applied. Use only new pieces of abrasive cloth or paper cut into 3" or 4" sections. Proceed at once with the successive polishing steps. The No. 100 grade aluminum oxide cloth is used lightly on the specimen for 45 seconds moving the flatly held cloth on top of the specimen to the point and reversing direction. Neither hard pressure nor continuous abrasion is used so the specimens do not get too hot. Next the 4/0 flint finishing paper is used for seventy-five seconds, with the 3" x 4" sheet folded double over the specimen longitudinally and held to the specimen with thumb on one side and the four fingers of the hand on the other. During the polishing time the paper is moved slightly longitudinally, ending the polishing with the thumb on the nose bevel. The final polishing is with the "0" grade emery polishing paper for forty-five seconds using the same technique as with the previous paper. The surface of the specimen is then cleaned with a solvent-dampened paper towel while the specimen is still turning. The finished specimen is removed from the chuck without touching with the fingers, and put into the plastic holder and immediately immersed in isooctane. The specimen is allowed to drain briefly before being placed in the oil to be tested. Note: To insure that the flat shoulder (that portion of the specimen perpendicular to the thread stem) and some threads on the stem do not rust an ⅛" protective gasket cut from ¼" flexible plastic tubing is slipped on the threaded stem before it is attached to the plastic holder.

PROCEDURE A FOR DISTILLED WATER

Use clean equipment for the test as specified in the ASTM method D665-60. Pour 300 ml. of the oil to be tested into the beaker and place the beaker in the testing apparatus. Cover the beaker with the beaker cover with the stirrer in position in the proper opening. Adjust the stirrer so that the shaft is 6 mm. off center in the beaker containing the oil sample and the blade is within 2 mm. of the bottom of the beaker.

Insert the test specimen assembly through the specimen the bottom of the beaker.

After the test specimen assembly has been suspended in the oil to be tested for 10 minutes of static wetting time, start the stirrer and continue to stir for twenty minutes to insure complete wetting of the steel specimen. With the stirrer in motion, add 30 ml. of distilled water through the thermometer hole, discharging the water on the bottom of the beaker. (The thermometer is omitted.) Continue stirring for 1 hour at a speed of 1000+ or −50 r.p.m. from the time the water was added. Stop stirirng at the end of the one-hour period, remove the specimen, wash with isopropyl alcohol, then ASTM precipitation naphtha or isooctane. The specimen is air dried and graded immediately. After grading the specimen may be preserved by coating with a clear lacquer or plastic.

Report

Visual inspection of the exposed steel specimen shall be as specified in ASTM method D665-60.

In order to report an oil as passing or failing, the test must be conducted in duplicate. If one specimen is rusted while the other is free of rust, tests on two additional specimens shall be made. The appearance of the specimens are rated according to the following tables:

| Appearance of specimen | Rating | Designation |
|---|---|---|
| Free of rust | Passes | R1 |
| Trace of few spots (less than 6 sq. mm.) | do | R2 |
| Less than 5% surface rusted | Barely passes | R3 |
| 5 to 50% surface rusted | Does not pass | R4 |
| To 90% surface rusted | do | R5 |
| Surface covered with light rust | do | R6 |
| Surface covered with heavy rust | do | R7 |

The product of Example A when employed in the above "Spindle" Rust Test for Petroleum Fuels at 3 p.p.m. in isooctane, gave a rating of R-1, the highest possible.

The above product of Example A was also tested for water tolerance according to:

[Water Separation Characteristics of Aviation Turbine Fuels (modified), Method 3256—Severity 15, to give the following results]

| Ex. | Concentration, p.p.m. | WSIM |
|---|---|---|
| A | 8 | 96 |
|   | 30 | 91 |

A rating of 85 or above is considered excellent. WSIM means water separation index modified. Therefore, this is an excellent composition from the water tolerance point of view.

The poly-ester-amide-acids of this invention can also be employed for any of the uses stated in U.S.P. 3,172,853 and in the concentrations stated therein.

As is quite evident, this patent application is replete with reactants which can be employed to prepare the poly-ester-amide-acids of this invention. It is, therefore, not only impossible to attempt a comprehensive catalogue of such reactants, but to attempt to describe the invention in its broader aspects in terms of specific chemical names of such reactants would be too voluminous and unnecessary since one skilled in the art could be following the description of the invention herein select a proper reactant. This invention lies in the preparation of poly-ester-amide-acids and their use as suitable rust and corrosion inhibitors, and their individual compositions are important only in the sense that their properties can affect this function. To precisely define each specific useful poly-ester-amide-acid in light of the present disclosure would merely call for chemical knowledge within the skill of the art in a manner analogous to a mechanical engineer who prescribes in the construction of a machine the proper materials and the proper dimensions thereof. From the description in this specification and with the knowledge of a chemist, one will know or deduce the applicability of specific poly-ester-amide-acids suitable for this invention by applying them as rust and corrosion inhibitors as set forth herein. In analogy to the case of a machine, wherein the use of certain materials of construtcion or dimensions of parts would lead to no practical useful result, various compositions will be rejected as inapplicable where others would be operative. We can obviously assume that no one will wish to use a useless composition nor will be misled because it is possible to misapply the teachings of the present disclosure to do so. Thus, any poly-ester-amide-acid that can perform the function stated herein can be employed.

Having thus described our invention what we claim as new and desire to obtain by Letters Patent is:

1. The process of inhibiting corrosion of metals and alloys in contact with corrosive media which comprises contacting said metals and alloys with a poly-ester-amide-acid composition formed by reacting (1) and alkyl or an alkenyl succinic acid or the anhydride thereof with (2) a polyol, the product of which is reacted with an alkanol amine to form an ester-amide and then reacting said so formed ester-amide with an alkyl or an alkenyl succinic acid or the anhydride thereof.

2. The process of claim 1 where the polyol is ethylene glycol and the alkanol amine is isopropanol amine.

3. The process of claim 1 where the polyol is a diol.

4. The process of claim 2 where (1) the alkyl or alkenyl group has about 8–18 carbons, (2) the diol is of the formula HOROH where R is a lower alkylene group, and (3) the alkanol amine is $NH_2ZOH$ where Z is a lower alkylene group.

5. The process of claim 4 where the diol is ethylene glycol and the alkanol amine is isopropanol amine.

6. The process of claim 1 where said alloys are ferrous alloys.

7. The process of claim 6 where said ferrous alloys are steels.

8. The process of claim 7 where (1) is tetrapropenyl succinic anhydride, (2) is monoisopropanolamine, and said so-formed ester-amide is reacted with tetrapropenyl succinic anhydride.

References Cited

UNITED STATES PATENTS

| 3,172,853 | 3/1965 | Stromberg | 252—8.55 E |
| 3,282,970 | 11/1966 | Riggs | 252—392 X |
| 3,324,033 | 6/1967 | Knapp | 260—485 J X |
| 3,364,000 | 1/1968 | Stromberg | 252—392 X |
| 3,381,022 | 4/1968 | LeSuer | 260—485 J U |

FOREIGN PATENTS

| 756,422 | 9/1956 | Great Britain | 260—482 R |

BARRY S. RICHMAN, Primary Examiner

U.S. Cl. X.R.

21—2.7; 252—8.55 E, 392